US008886736B2

(12) United States Patent
Vanteddu et al.

(10) Patent No.: US 8,886,736 B2
(45) Date of Patent: Nov. 11, 2014

(54) METHOD AND SYSTEM FOR QUERYING, MONITORING AND CONTROLLING A WIRELESS SENSOR NETWORK USING INSTANT MESSAGING SYSTEM

(75) Inventors: Adi Mallikarjuna Reddy Vanteddu, Kurnool (IN); Siva Prasad Katru, Guntur (IN); Kumar Padmanabh, Bangalore (IN)

(73) Assignee: Infosys Limited (IN)

( * ) Notice: Subject to any disclaimer, the term of this patent is extended or adjusted under 35 U.S.C. 154(b) by 217 days.

(21) Appl. No.: 13/440,238

(22) Filed: Apr. 5, 2012

(65) Prior Publication Data

US 2012/0191798 A1     Jul. 26, 2012

Related U.S. Application Data

(62) Division of application No. 12/813,674, filed on Jun. 11, 2010.

(30) Foreign Application Priority Data

Dec. 24, 2009   (IN) ........................... 3177/CHE/2009

(51) Int. Cl.
    *G06F 15/16*       (2006.01)
(52) U.S. Cl.
    USPC ........................... 709/206; 709/220; 709/224
(58) Field of Classification Search
    USPC ....................................................... 709/206
    See application file for complete search history.

(56) References Cited

U.S. PATENT DOCUMENTS

| | | | |
|---|---|---|---|
| 7,817,994 B2 | 10/2010 | Funk et al. | |
| 2002/0067381 A1* | 6/2002 | Hugh | 345/854 |
| 2006/0059239 A1* | 3/2006 | Kouznetsov et al. | 709/206 |
| 2007/0058634 A1 | 3/2007 | Gupta et al. | |
| 2007/0067465 A1* | 3/2007 | Blinn et al. | 709/229 |
| 2007/0105544 A1* | 5/2007 | Veres et al. | 455/423 |
| 2007/0286181 A1 | 12/2007 | Bushmitch et al. | |
| 2008/0059493 A1 | 3/2008 | Blohm | |
| 2008/0154393 A1 | 6/2008 | Reshef | |
| 2008/0184170 A1* | 7/2008 | Periyalwar | 715/841 |
| 2008/0208605 A1 | 8/2008 | Sinha et al. | |
| 2008/0311903 A1 | 12/2008 | Levin | |
| 2010/0217814 A1 | 8/2010 | Strueber | |

* cited by examiner

*Primary Examiner* — Hua Fan
(74) *Attorney, Agent, or Firm* — Lerner, Daivd, Littenberg, Krumholz & Mentlik, LLP

(57) ABSTRACT

A method for communicating with one or more sensor nodes in a Wireless Sensor Network (WSN) over a network is disclosed. The method includes initiating communication with the sensor nodes by sending messages to the server application using the instant messaging system. The server application formats the received messages and communicates to the sensor nodes and in turn also receives responses from the sensor nodes and communicates them back to the IM client. The method also includes steps for enabling a WSN messaging client to converse with an instant messaging client over the network during communication with the one or more sensor nodes in the WSN. The method further includes identifying the IM client the user has employed for communication and the corresponding IM protocol. Also, the method includes the step of configuring the WSN messaging client with the same IM protocol to enable communication.

13 Claims, 5 Drawing Sheets

METHOD AND SYSTEM FOR QUERYING, MONITORING AND CONTROLLING A WIRELESS SENSOR NETWORK USING INSTANT MESSAGING SYSTEM

CROSS-REFERENCE TO RELATED APPLICATIONS

The present application is a divisional of U.S. patent application Ser. No. 12/813,674, filed Jun. 11, 2010, the disclosure of which is hereby incorporated herein by reference.

BACKGROUND OF THE INVENTION

The present invention generally relates to wireless sensor networks, and particularly, to a method and system for communicating with a plurality of sensor nodes using one or more instant messengers over a network.

In the present hectic schedule, remote monitoring of ambience in a given area is gaining importance as it may not be possible and feasible to monitor the ambience by being physically present in the given area at any point of time. To address such issues, in the prior art, a Wireless Sensor Network (WSN) that may be installed in the environment where the ambience needs to be monitored was introduced. The WSN is a collection of networked tiny electronic devices (herein also referred to as "sensor nodes") that are capable of sensing, processing and communication information. These sensor nodes generally read ambience information from the surrounding environment and convert the information into one or more data packet(s). These data packets are processed and may then be transmitted to users via one or more base stations, using a wireless network.

A typical WSN may be monitored through various communication channels that include a standalone/desktop application, a web-based application or a mobile application.

In case of a standalone/desktop application, specialized software is used to visualize and monitor the sensor nodes in the WSN from the base station. Users may send commands using this software to tune the behavior of the sensor nodes to some extent. However, it requires the user to have expertise in using the specialized software.

In case of a web-based application, commands that are sent by the users to the application are routed to the sensor nodes in the WSN via the base station. However, this requires the user to authenticate the web-based application specifically to send commands to the sensor nodes. Further, a specific web-based application needs to be customized for monitoring the sensor nodes.

In case of a mobile application, users may send the query to the WSN to know the status of sensor nodes in the network. Though mobile applications (devices) have an interface to communicate with the WSN, they cannot be used to perform complex operations such as sending a new code to the sensor nodes in the network.

Collectively, these applications that are being used to control or monitor the sensors nodes in the WSN have one or more drawbacks. In the standard controller application, the desktop software installed on a particular machine needs to be accessed for controlling. The user needs to have domain knowledge in order to use the desktop application. The web-based applications have overcome this disadvantage by allowing users to access the application from anywhere, but restrict the users to desktops or mobiles. Similarly, the interface through mobile devices may provide access to WSN from anywhere. Though mobile devices have provided interface to communicate with WSN, they may not be used to perform complex operations like sending new code to the sensors nodes.

Thus, all the techniques mentioned above are associated with one or more problems and hence, there is a need for a new communication means which will allow the users to monitor or control the WSN, without the need to install any software, other than instant messenger, on their desktop computers or mobile devices. Further, the user should not have to customize the web-application to communicate with the WSN using the communication means. Finally, the communication means should not require the user to learn or have expertise in using specialized software for communicating with the WSN.

BRIEF SUMMARY OF THE INVENTION

A method to communicate with one or more sensor nodes in a Wireless Sensor Network (WSN) over a network is disclosed. Also, a method for enabling a WSN messaging client to converse with an instant messaging client over a network during communication with one or more sensor nodes in the WSN is disclosed. Such a method may help in establishing communication between the sensor nodes and a user, to either get live updates of data monitored by the sensor nodes or for controlling the sensor nodes. Also, the method may help in querying the sensor nodes to ascertain the status of the sensor nodes.

In one embodiment of the present technique, the method for communicating with one or more sensors in the WSN over the network includes the step of initiating communication with a server application by sending a message from an instant messaging client. The server entity may include at least one of a WSN messaging client and a WSN server. The method further includes the step of encoding the message received by the server application by using the WSN messaging client. The encoded message is sent to the one or more sensor nodes using the WSN server.

Further, the method includes the step of receiving an encoded response from the sensor nodes through the WSN server. The encoded response is decoded by the WSN messaging client before sending the decoded message to the instant messaging client.

In one embodiment of the present technique, the WSN messaging client and the WSN server may be a single entity. In another embodiment of the present embodiment, the WSN server and the WSN messaging client are separate entities. In one embodiment of the present technique, the message sent from the instant messaging client to the WSN messaging client and vice-versa uses at least one of a plurality of instant messaging protocols.

In one embodiment of the present technique, the method to enable the WSN messaging client to converse with the instant messaging client over the network includes the step of identifying at least one of the plurality of instant messaging clients that the user is using for communication by sending messages and determining corresponding instant messaging protocols used by the identified instant messaging client. The method further includes the step of configuring the WSN messaging client to operate with at least one of the determined instant messaging protocol. Finally, the method includes adding a messaging buddy with its unique identifier name in one or more instant messaging clients to facilitate communication with one or more sensor nodes in the WSN over the network through the WSN messaging client.

The method additionally includes the step of creating the messaging buddy for each of the configured WSN messaging clients with a unique identifier name by checking the availability of the unique identifier name with at least one of the WSN messaging client and the instant messaging client.

In one embodiment of the present technique, the network may be an Internet and a local area network (LAN).

BRIEF DESCRIPTION OF THE DRAWINGS

The above mentioned features as well other features, aspects, and advantages of the present invention will become better understood when the following detailed description is read with reference to the accompanying drawings in which like characters represent like parts throughout the drawings, wherein.

DETAILED DESCRIPTION

The following description is full and informative description of the best method and system presently contemplated for carrying out the present invention, which is known to the inventors at the time of filing the patent application. Of course, many modifications and adaptations will be apparent to those skilled in the relevant arts in view of the following description, in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

The present invention relates to a method and system for facilitating communication with one or more sensor nodes in a Wireless Sensor Network (WSN) over a network. The method also details an approach for enabling a WSN messaging client to converse with an instant messaging client over a network during communication with one or more sensor nodes in the WSN. The inventive technique to be detailed in the subsequent sections to follow also explains numerous variations to implement the inventive steps of the present technique in terms of one or more embodiments.

The following description is presented to enable a person of ordinary skill in the art to make and use the invention and is provided in the context of the requirement for obtaining a patent. The present description is the best presently contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

Figure 1:
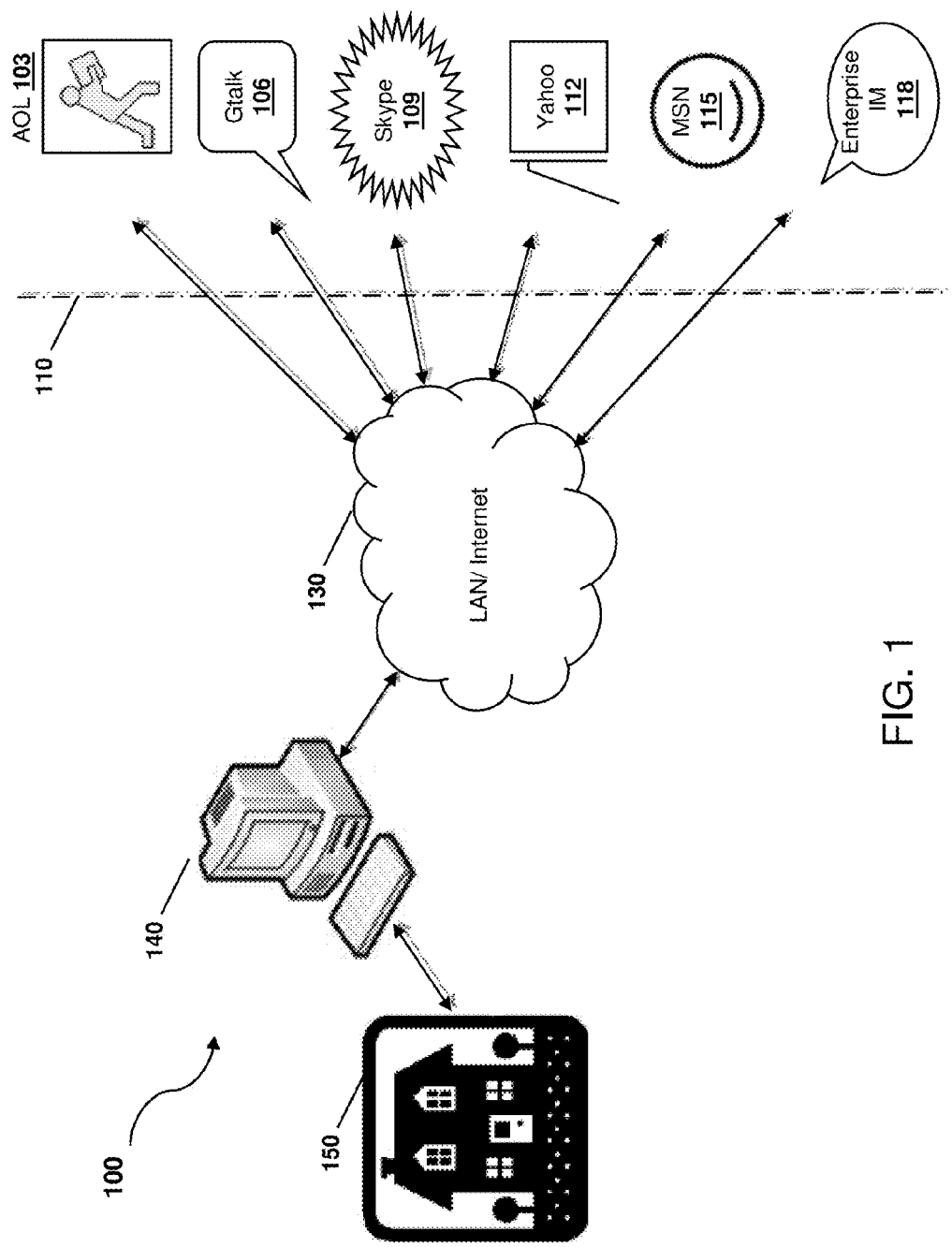
FIG. 1 is an exemplary environment illustrating communication of instant messaging clients with a Wireless Sensor Network (WSN) enabled edifice over a network, according to one embodiment of the present technique.

Referring to the figures, FIG. 1 is an exemplary environment illustrating communication of instant messaging clients with a Wireless Sensor Network (WSN) enabled edifice over a network, according to one embodiment of the present technique. In one embodiment of the present technique, the exemplary environment 100 includes at least one an instant messaging client 110, a network 130, a server application 140 and a WSN enabled edifice 150. In one embodiment of the present technique, the exemplary environment 100 may be set up for monitoring the condition of the edifice 150 (i.e. home in this case), which is WSN enabled, using one or more instant messaging clients 110. In another embodiment of the present technique, the exemplary environment may be a house and the owner is in an office and wants to monitor his/her house hold appliances whether they are switched on or off. Else, the owner may want to check whether some one has intruded into his/her house.

In one embodiment of the present technique, the instant messaging clients 110 may include at least one of an enterprise instant messaging client 118 and a public instant messaging client (not numbered). The public instant messaging client may include at least one of an AOL® client 103, a Google Talk™ client 106, a Skype™ client 109, a Yahoo!® client 112 and a MSN® client 115. The enterprise messaging client 118 may include at least one of an IBM® Lotus® Sametime client, a Microsoft® Office Communicator client and an Oracle® Beehive client. The scope of the invention should not be restricted in light of the IM clients depicted hereby.

In one embodiment of the present technique, the network 130 may include Internet or a Local Area Network (LAN). In one embodiment of the present technique, the server application 140 may allow users (not shown) to send messages using instant messaging client 110 to the deployed WSN. The server application 140 also allows extraction of meaningful messages sent by a sensor node within the WSN and communicates it to the user through the instant messaging (herein also referred to as "IM") client 110. The server application 140 may also allow the users to control sensor nodes and present conditional information of the sensor nodes. The server application 140 can handle incoming messages from different IM clients and may support multiple IM protocols to communicate with the WSN enabled edifice 150.

In one embodiment of the present technique, the WSN enabled edifice 150 may include one or more sensor nodes (not shown) within it. These sensor nodes may be used to monitor the situation of the edifice where it is installed. The sensor nodes may take command for controlling home appliances with one or more messages from the IM client (i.e. Google Talk™, Yahoo!®, etc).

In one embodiment of the present technique, the communication with the sensor nodes using the IM client over the network is performed using at least one of a mobile application, a desktop application, a laptop application, and a web application.

Figure 2:
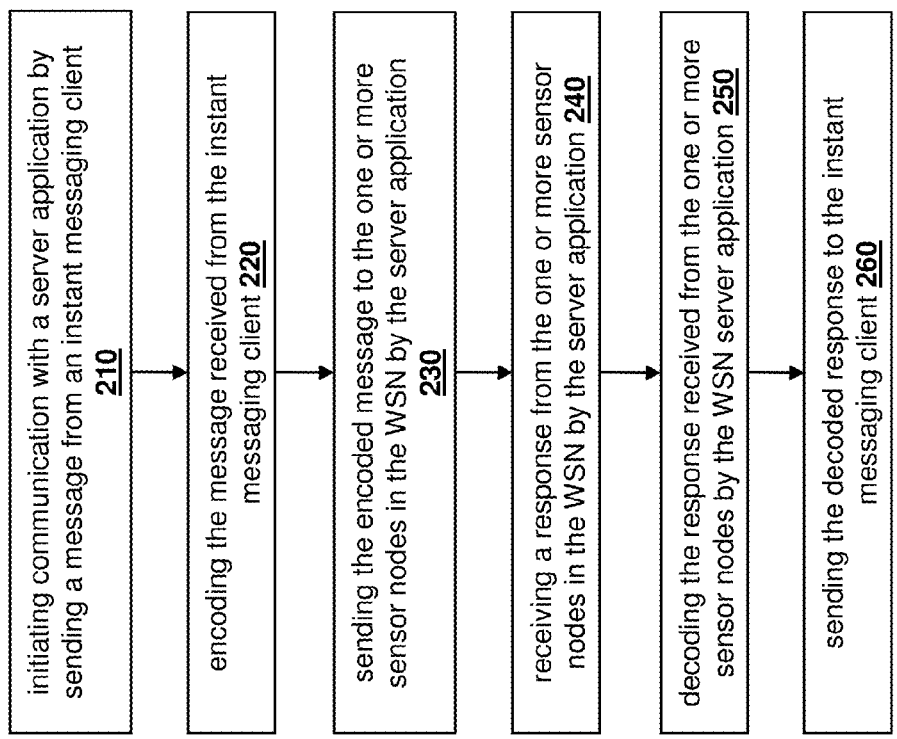
FIG. 2 is a flow diagram depicting a method of communicating with one or more sensor nodes in a Wireless Sensor Network (WSN) over a network, according to one embodiment of the present technique.

Referring to the figures, FIG. 2 is a flow diagram depicting a method of communicating with one or more sensor nodes in a Wireless Sensor Network (WSN) over a network, according to one embodiment of the present technique.

In one embodiment of the present technique, the method comprises: 1) initiating communication with a server application by sending a message from an instant messaging client (block 210); 2) encoding the message received from the instant messaging client (block 220); 3) sending the encoded message to one or more sensor nodes in the WSN by the server application (block 230); 4) receiving a response from the one or more sensor nodes in the WSN by the server application (block 240); 5) decoding the response received from the one or more sensor nodes by the WSN server application (block 250); and 6) sending the decoded response to the instant messaging client (block 260). Each of the steps will be explained in detail in the subsequent sections.

The method of communication with one or more sensor nodes in a Wireless Sensor Network (WSN) over a network may begin with a step of initiating communication with a sever application by sending a message from an IM client as represented by block 210. In step 210, the user may initiate communication with the one or more sensor nodes through the IM client, which the user has employed for communication. The messages are sent across the network. The network may be an Internet or a Local Area Network (herein also referred to as "LAN"). The messages which were sent from the IM client are received by the server application and are processed before being forwarded to the sensor nodes, as represented by block 220. In one embodiment of the present technique, the server application may be a gateway or a base station. In step 220, the message is encoded in a format essential for the sensor nodes to interpret. The process of encoding the messages is performed by a WSN client application. In one embodiment of the present technique, the WSN client application may be a part of the server application or may be a discrete module.

In step 230, the encoded message is forwarded to the one or more sensor nodes in the WSN by the server application. The process of sending the encoded message to the sensor nodes may be performed by a WSN server. In one embodiment of the present technique, the WSN server may be a part of the server application or may be a discrete module.

The message sent from the user through the IM client to the one or more sensor nodes may include at least one of a request message, a command message, and a query message. In one embodiment of the present technique, the request message may be receive the monitored data by one or more sensors. The monitored data may include checking status of the electric application or main door or etc. Similarly, the command message may include controlling the activity of the sensor nodes. The process of controlling the senor nodes may include changing the condition to be monitored or threshold, and so forth. The query message may include checking the health or condition of the sensor nodes, which are deployed in the WSN enabled edifice for monitoring conditions.

In step 240, the sensor nodes on receiving the encoded message may respond based on the type of the message received. In one embodiment of the present technique, the response sent by the sensor nodes may be received by the server application. The WSN server may receive the response from the sensor nodes.

In step 250, the response received from the sensor nodes is sent to the WSN messaging client for decoding, so that it may be interpreted for subsequent use. The decoded message is later forwarded, by the WSN messaging client, to the IM client, as represented by block 260. The forwarded message from the WSN messaging client is easily interpreted by the IM client and presented to the user.

The steps depicted in the above method allow the user to communicate with the one or more sensors in the WSN network using the IM client, which are currently employed for communication with others. Thus, this method does not require the user to install any software, other than an instant messenger, on their desktop computers or mobile devices to communicate with the WSN.

Figure 3:
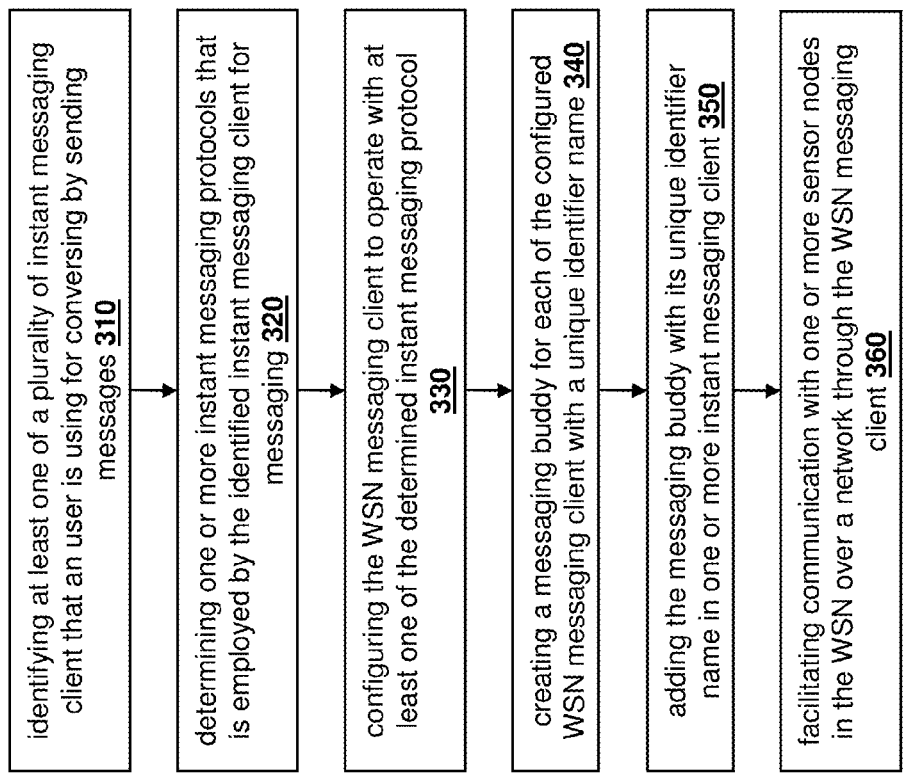
FIG. 3 is a flow diagram depicting a method for enabling a WSN messaging client to converse with an instant messaging client over the network during communication with one or more sensor nodes in the WSN, according to one embodiment of the present technique.

Referring to the figures, FIG. 3 is a flow diagram depicting a method for enabling the WSN messaging client to communicate with an instant messaging client over the network during communication with one or more sensor nodes in the WSN, according to one embodiment of the present technique.

In one embodiment of the present technique, the method comprises: 1) identifying at least one of a plurality of instant messaging clients that the user is using for communication by sending messages (block 310); 2) determining one or more instant messaging protocols that are employed by the identified instant messaging client for messaging (block 320); 3) configuring the WSN messaging client to operate with at least one of the determined instant messaging protocols (block 330); 4) creating a messaging buddy for each of the configured WSN messaging clients with a unique identifier name (block 340); 5) adding the messaging buddy with its unique identifier name in one or more instant messaging clients (block 350); and 6) facilitating communication with one or more sensor nodes in the WSN over a network through the WSN messaging client (block 360). Each of the steps will be explained in detail in the subsequent sections.

The method for enabling the WSN messaging client to communicate with an instant messaging client over the network during communication with one or more sensor nodes in the WSN may begin with a step of identifying at least one of a plurality of instant messaging clients that the user is using for communication by sending messages as represented by block 310. In this step, the user may be queried to determine the type of IM client that they are using for communication with either family or friends or colleagues. This information may be used to configure the server application, which is going to be deployed at the users' edifice. The server application may include the WSN messaging client and a WSN server or both. The configuration of the server application may mean configuring the WSN messaging client. In one embodiment of the present technique, the IM client may include an enterprise IM client or a public IM client. The public IM client may include any of an XMPP client, a Yahoo!® client, a Google™ client, a Hotmail® client, an AOL® client, and a Skype™ client. The enterprise IM client may include at least one of an IBM® Lotus® Sametime client, a Microsoft® Office Communicator client and an Oracle® Beehive client. The IM client depicted above should not be restricted in light of the scope of the inventive steps detailed as per the present technique.

In step 320, based on the type of IM client the users are using for communication, the corresponding instant messaging protocol that is employed by the identified IM client for messaging is determined. The IM protocol may include an XMPP protocol, a YMSG protocol, a Skype™ protocol, an ICQ protocol and an MSN® protocol.

In step 330, the WSN messaging client is configured to operate with at least one of the determined IM protocols. This configuration is essential to bring the WSN messaging client and the IM client under the same IM protocol, so that the messages that were sent to the one or more sensor nodes during communication may be received by the WSN messaging client before the messages are received by the one or more sensor nodes. In one embodiment of the present technique, the WSN messaging client may be configured to operate with more than one IM protocol, based on the requirement or demand of the users.

In step 340, on completion of configuration of the WSN messaging client to operate in the detected IM protocol, a messaging buddy may be created for each of the configured WSN messaging clients with a unique identifier name. The creation of the messaging buddy may be optional. The messaging buddy is an instance of the WSN messaging client. The messaging buddy represents the WSN messaging client which is configured within the server application for enabling communication with the external IM client, which the user is using for communication. The messaging buddy may differ based on the WSN messaging client and the underlying protocol IM protocol on which it is configured. The existing messaging buddy with its unique name may be considered. In case a new messaging buddy is created, than the buddy may have the unique name of the user choice. The unique name may also include a domain name, and the domain name may be derived from the WSN setup installed at the edifice.

In one embodiment of the present technique, the messaging buddy with its unique name refers to the at least one of the sensor node or a group of sensor nodes in the WSN. Thus, assigning one unique identifier name to the sensor nodes or group of sensor nodes allows the users to communicate to an individual sensor node or group of sensor nodes.

In another embodiment of the present technique, the existing messaging buddy with its unique identifier name may refer to the standard messaging buddy name created by a service provider of the WSN. For instance, the messaging buddy may be named as a conference room in building XYZ or conference rooms in certain XYZ locations. Thus, the individual sensor node or the group of nodes associated with this name is referenced by this unique identifier name of the messaging buddy which allows the users to communicate with the messaging buddy.

In step 350, the messaging buddy with its unique identifier name is added in one or more instant messaging clients of the user. The user may add different messaging buddies in corresponding IM clients, based on the IM protocol on which the WSN messaging client is configured and the IM client is operational. For example, if the WSN messaging client is configured for working with XMPP protocol, than the messaging buddy that is either created or selected may be added to the IM client that supports XMPP protocol such as, for example, Google Talk™.

In step 360, the added messaging buddy facilitates the user to communicate with one or more sensor nodes in the WSN over a network through the WSN messaging client. The user may converse with the sensor nodes, just like he/she is conversing with a person. The user may get to know the status of the sensor nodes or monitor the edifice where the sensor nodes are deployed, or even change the control threshold set for the sensor nodes. The method of communicating with the sensor nodes has been explained in conjunction with FIG. 2. This facility is available to the user without the need for the user to install additional software in there desktop or laptop. The user may communicate with the one or more sensor nodes using the instant messaging client over the network using at least one of a mobile application, a desktop application, a laptop application, and a web application.

Figure 4:
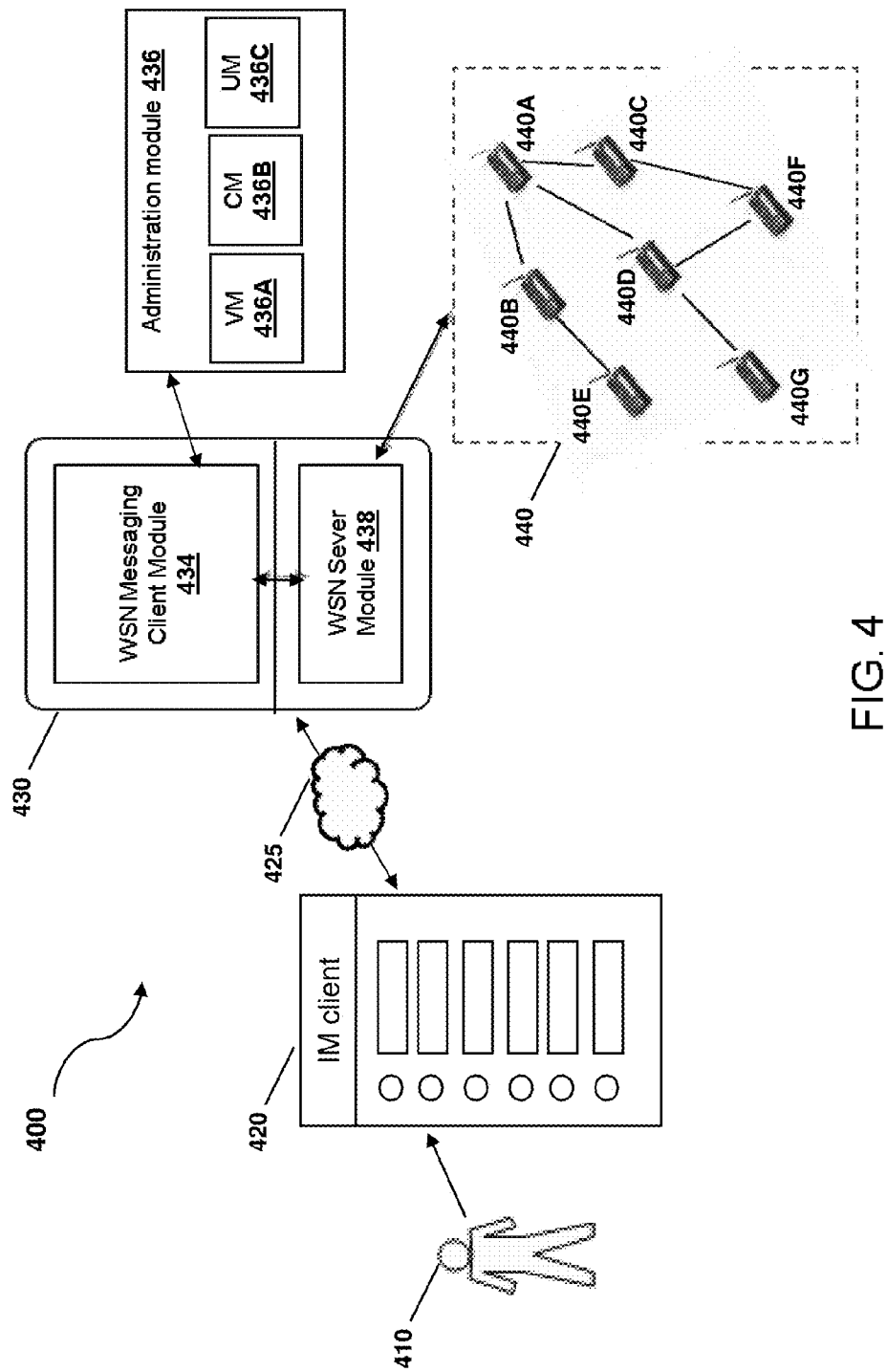
FIG. 4 is a block diagram illustrating communication of instant messaging client with one or more sensor nodes in the WSN over a network, according to one embodiment of the present technique.

Referring to the figures, FIG. 4 is a block diagram illustrating communication of instant messaging client with one or more sensor nodes in the WSN over a network, according to one embodiment of the present technique.

In one embodiment of the present technique, the block diagram 400 illustrates a system for communicating with one or more sensor nodes in a Wireless Sensor Network (WSN) over a network. In one embodiment of the present technique, the system 400 may be set up for monitoring the condition of the edifice (not shown), which is WSN enabled, using the IM client 410. In another embodiment of the present technique, the exemplary environment may be a house or an office.

In one embodiment of the present technique, the system includes at least one of the IM clients 410, a server application 430 and a WSN 440. In one embodiment of the present technique, a user 410 may initiate communication with a sensor node 400A-G through the IM client 420. The user 410 may converse with the server application 430 using IM client 420 through a network 425.

In one embodiment of the present technique, the user 410 may initiate communication with at least one of the sensor nodes 440 A-G using the IM client 420, which the user has employed for communication.

In one embodiment of the present technique, the IM client 420 may include at least one of an XMPP client, a Yahoo!® client, a Google™ client, a Skype™ client, an ICQ client, an MSN® client, an IBM® Lotus® Sametime client, a Microsoft® Office Communicator client and an Oracle® Beehive client or combinations thereof. The scope of the invention should not be restricted with respect to the number of IM client 420 mentioned above. It should be noted that other IM clients not mentioned above may also be used for communication without deviating from the scope of the present technique.

The IM client 420 may operate using one or more IM messaging protocols. In one embodiment of the present technique, the IM protocol may include at least one of an XMPP protocol, a YMSG protocol, a Skype™ protocol, an ICQ protocol and an MSN® protocol.

On initiation of communication, the IM client 420 may send a message to the server application 430 over the network 425. The network 425 may include at least one of Internet and a Local Area Network (LAN).

In one embodiment of the present technique, the server application 430 may be a gateway or a base station to handle the communication related to the WSN. The server application 430 may include at least one of a WSN messaging client module 434 and a WSN server module 438 or combinations thereof. In another embodiment of the present technique, the WSN messaging client module 434 and the WSN server module 438 may be discrete units.

In one embodiment of the present technique, the WSN messaging client 434 may be configured using an application programming interface (API). The API used for configuring the WSN messaging client 434 may differ based on the type of the IM protocol the IM client 420 uses. In one embodiment of the present technique, a SMACK API may be used to build WSN messaging client 420, which may be operable using the XMPP protocol. Similarly, any other known APIs may be used for configuring the WSN messaging client 420, based on the requirement of the user.

In one embodiment of the present technique, on receipt of the messages, the WSN messaging client 410 encodes the same. The encoding of the message is essential to synchronize the message in a format, which the sensor nodes 440A-G may be able to interpret. The encoded messages may be forwarded to the WSN server 438 for further communication with the sensor nodes 440A-G.

The WSN messaging client 410, on receipt of the response from the sensor nodes 440A-G, may decode the same. The decoding of the response is essential to synchronize the response in the format, which the IM client may be able to interpret. The decoded response may be presented to the user 410.

In one embodiment of the present technique, the WSN server 438 may be the communicating entity, which sends the encoded messages to the sensor nodes 440A-G in the WSN 440. Also, the WSN sever 438 may receive the encoded response sent from the one or more sensor nodes 440A-G in the WSN 440. In one embodiment of the present technique, the WSN server 438 functions like the base station or the gateway routing the message between the WSN 440 and the server application 430. In one embodiment of the present technique, an OpenFire API may be used for configuring the WSN server 438. The WSN server configured using the OpenFire API is compatible to operate with the XMPP protocol based WSN messaging client 434. Similarly, in another embodiment of the present technique, any other known API may be used to configure the WSN server 438 depending upon the underlying protocol on which the WSN messaging client 434 is operating. The scope of the present invention should not be restrictive based upon the description provided above.

In one embodiment of the present technique, the WSN network 440 may include a plurality of sensor nodes 440A-G depending on the requirement of the user, where the WSN 440 is deployed. The WSN 440 may be generally configured in the home or the office to monitor the condition.

The sensor nodes 440A-G, on receipt of the encoded message, interpret the information and act accordingly either by sending the encoded response back to the WSN server 438 or enquiring the status of the adjacent sensor nodes or controlling or changing the threshold or condition which the nodes are meant for monitoring.

In one embodiment of the present technique, the IM client 420, which the user 410 has employed for communication is identified and upon identification of the same, the IM protocol of IM client 420 is determined for tuning the WSN messaging client 434 so that the WSN messaging client 434 operates using the same IM protocol. The configuration of the WSN messaging client 434 to operate with the same IM protocol as determined in the IM client 410 is required for providing the same platform, to enable the conversation between the two.

In one embodiment of the present technique, a messaging buddy may be created using the API depending on the requirement of the user. The type of the API used to create the buddy may depend on the underlying WSN messaging client 434 used. The SMACK API may be used to create a messaging buddy if the WSN messaging client 434 operates using XMPP protocol.

In another embodiment of the present technique, the messaging buddy may be used to converse using the WSN messaging client 434. For instance, if the messaging buddy is of Google Talk™, the same may be used in the WSN messaging client 434 for communication with the IM client 420.

The messaging buddy may include a unique name. The unique name, in turn, includes a buddy name and a domain name. The buddy name may be a user name or the name of the WSN network or anything of user's choice. The domain name may be the IM client 410 name or the WSN 440 name. The messenger buddy with its unique name is added in the IM client before initiating the communication with the sensor nodes 440A-G. In one embodiment of the present technique, the availability of the unique name may be enquired with the WSN messaging client 434 or the IM client 410.

The WSN messaging client 434 further includes an administration module 436, which is used for monitoring the administrating activity within the WSN. The validation module 436A of the administration module 436 may be used by an owner of the WSN to provide an administrative access in the WSN. The owner (herein also referred to as "authorized user") may need to provide the consent for adding the messaging buddy with its unique identifier name by other users in their IM. In another embodiment of the present invention, the authorized user may register a number of other users; those are entitled for accessing the WSN network through their IM. The process of adding the messaging buddy may include enabling the messaging buddy made available for communication with the other users through their instant messaging client.

In one embodiment of the present technique, the administration module 436 may include a controller module 436B for providing the service provider of the WSN with an ability to control or view or query or monitor the WSN. The controller module may also WSN service provider to check the activities of one or more sensors in the WSN.

In one embodiment of the present technique, the user module 436C of the administration module 436 may provide selective access restriction to other users for communication with the one or more sensor nodes in the WSN.

In one embodiment of the present technique, with the detailed setup explained above the system 400 may enable the user 410 to communicate with the one or more sensor nodes 440A-G using their respective IM client 420.

In one embodiment of the present technique, the main advantage includes providing easy means to communicate with the sensor nodes using the commonly available IM clients. The users need not install any additional software, other than instant messenger, on their desktop computers or mobile devices for communication purpose.

Exemplary Computing Environment

Figure 5:
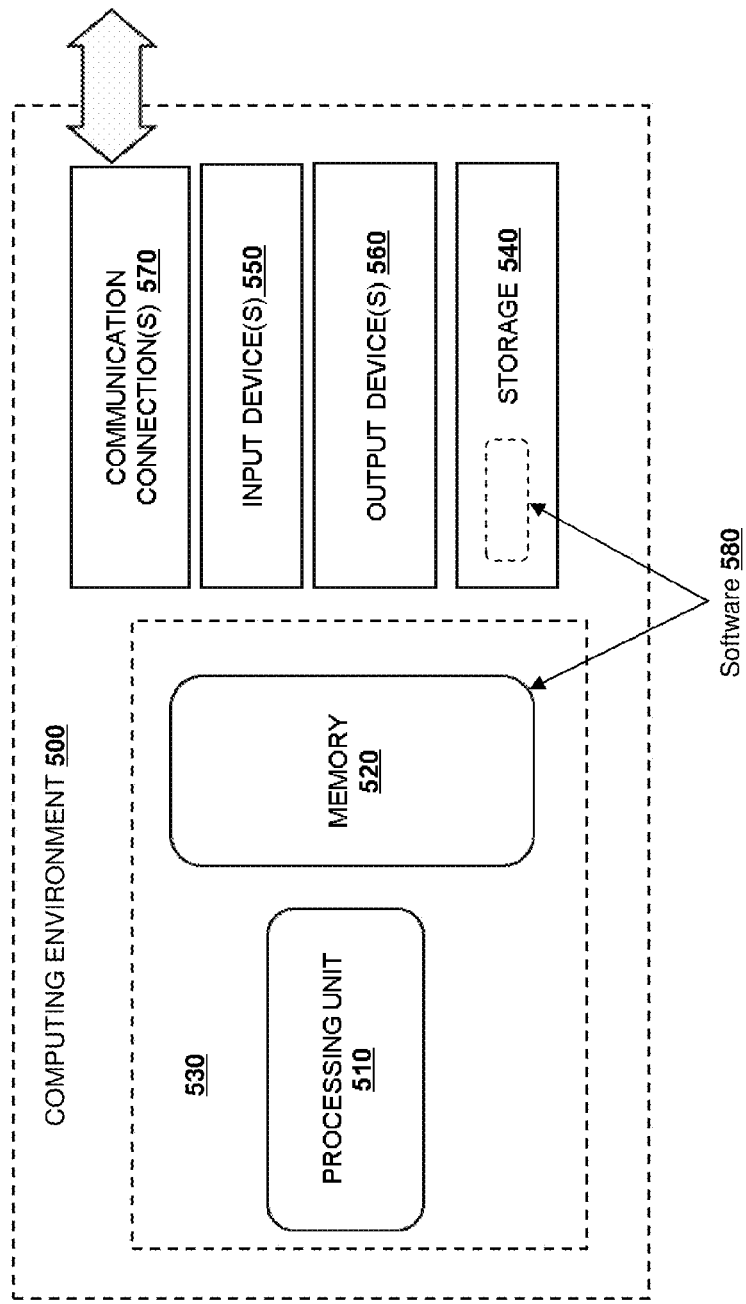
FIG. 5 is a system illustrating a generalized computer network arrangement, in one embodiment of the present technique.

One or more of the above-described techniques can be implemented in or involve one or more computer systems. FIG. 5 illustrates a generalized example of a computing environment 500. The computing environment 500 is not intended to suggest any limitation as to scope of use or functionality of described embodiments.

With reference to FIG. 5, the computing environment 500 includes at least one processing unit 510 and memory 520. In FIG. 5, this basic configuration 530 is included within a dashed line. The processing unit 510 executes computer-executable instructions and may be a real or a virtual processor. In a multi-processing system, multiple processing units execute computer-executable instructions to increase processing power. The memory 520 may be volatile memory (e.g., registers, cache, RAM), non-volatile memory (e.g., ROM, EEPROM, flash memory, etc.), or some combination of the two. In some embodiments, the memory 520 stores software 580 implementing described techniques.

A computing environment may have additional features. For example, the computing environment 500 includes storage 540, one or more input devices 550, one or more output devices 560, and one or more communication connections 570. An interconnection mechanism (not shown) such as a bus, controller, or network interconnects the components of the computing environment 500. Typically, operating system software (not shown) provides an operating environment for other software executing in the computing environment 500, and coordinates activities of the components of the computing environment 500.

The storage 540 may be removable or non-removable, and includes magnetic disks, magnetic tapes or cassettes, CD-ROMs, CD-RWs, DVDs, or any other medium which can be used to store information and which can be accessed within the computing environment 500. In some embodiments, the storage 540 stores instructions for the software 580.

The input device(s) 550 may be a touch input device such as a keyboard, mouse, pen, trackball, touch screen, or game controller, a voice input device, a scanning device, a digital camera, or another device that provides input to the computing environment 500. The output device(s) 560 may be a display, printer, speaker, or another device that provides output from the computing environment 500.

The communication connection(s) 570 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 500, computer-readable media include memory 520, storage 540, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

The invention claimed is:

1. A method for enabling a Wireless Sensor Network (WSN) messaging client to converse with an instant messaging client over a network during communication with one or more sensor nodes in the WSN, the method comprising:
   identifying a first instant messaging client from among a plurality of instant messaging clients that a user is using for conversing by sending messages, wherein the first instant messaging client employs a first instant messaging protocol that is different from a second instant messaging protocol employed by a second instant messaging client from among the plurality of instant messaging clients;
   determining one or more instant messaging protocols that are employed by the identified at least one instant messaging client;
   configuring the WSN messaging client to communicate with the first instant messaging client, wherein configuring the WSN messaging client comprises:
      selecting an application programming interface (API) from among a plurality of API's each configured to provide instant messaging communication functionality, wherein the selected API provides instant messaging communication functionality compatible with the first instant messaging protocol; and
      implementing within the WSN messaging client, instant messaging communication capability based on functionality provided within the selected API; and
   configuring the first instant messaging client for network communication with the one or more sensor nodes in the WSN through the WSN messaging client, by adding to the first instant messaging client a messaging buddy with a unique identifier name associated with the configured WSN messaging client.

2. The method as recited in claim 1, wherein the step of configuring the WSN messaging client comprises tuning the WSN messaging client to operate with at least one of an XMPP protocol, an YMSG protocol, a Skype™ protocol, an ICQ protocol, a Virtual Places protocol, Session Initiation protocol, Simple Mail Transfer Protocol, and an MSN® protocol.

3. The method as recited in claim 1, wherein the messaging buddy is an instance of the WSN messaging client.

4. The method as recited in claim 3, wherein the messaging buddy with its unique identifier name refers to one of the one or more sensor nodes in the WSN or to a group of sensor nodes in the WSN.

5. The method as recited in claim 1, wherein the step of creating the messaging buddy comprises checking availability of the unique identifier name with at least one of the WSN messaging client and the instant messaging client.

6. The method as recited in claim 5, wherein the step of creating the messaging buddy comprises configuring the WSN messaging client with at least one domain name.

7. The method as recited in claim 1, wherein the messaging buddy with its unique identifier name is added to the instant messaging client of at least one or more users.

8. The method as recited in claim 7, additionally comprises the step of validating the messaging buddy before adding to the instant messaging, by the WSN messaging client.

9. A computer program product comprising a non-transitory computer usable medium having a computer readable program code embodied therein for enabling a Wireless Sensor Network (WSN) messaging client to converse with an instant messaging client over a network during communication with one or more sensor nodes in a WSN, the computer program product comprising:
   a program code adapted for:
      identifying a first instant messaging client from among a plurality of instant messaging client that an user is using for communication by sending messages, wherein the first instant messaging client employs a first instant messaging protocol that is different from a second instant messaging protocol employed by a second instant messaging client from among the plurality of instant messaging clients;
      determining one or more instant messaging protocols that is employed by the identified at least one instant messaging client;
      configuring the WSN messaging client to communicate with the first instant messaging client wherein configuring the WSN messaging client comprises:
         selecting an application programming interface (API) from among a plurality of API's each configured to provide instant messaging communication functionality, wherein the selected API provides instant messaging communication functionality compatible with the first instant messaging protocol; and implementing within the WSN messaging client, instant messaging communication capability based on functionality provided within the selected API; and configuring the first instant messaging client for network communication with the one or more sensor nodes in the WSN through the WSN messaging client, by adding to the first instant messaging client a messaging buddy with a unique identifier name, associated with the configured WSN messaging client.

10. The method as recited in claim 1, wherein identification of the at least one of a plurality of instant messaging clients is achieved by querying the user.

11. The method as recited in claim 1, wherein the WSN messaging client is configured to operate with more than one instant messaging protocol based on a user demand.

12. A method for enabling a Wireless Sensor Network (WSN) messaging client to converse with an instant messaging client over a network during communication with one or more sensor nodes in the WSN, the method comprising:

identifying a first instant messaging client from among a plurality of instant messaging clients that a user is using for conversing by sending messages, wherein the first instant messaging client employs a first instant messaging protocol that is different from a second instant messaging protocol employed by a second instant messaging client from among the plurality of instant messaging clients;

determining one or more instant messaging protocols that are employed by the identified at least one instant messaging client;

configuring the WSN messaging client to operate with the determined one or more instant messaging protocols; and configuring the first instant messaging client for network communication with the one or more sensor nodes in the WSN through the WSN messaging client, by adding to the first instant messaging client a messaging buddy with a unique identifier name associated with the configured WSN messaging client, wherein:

the unique identifier name associated with the configured WSN messaging client includes a domain name corresponding to the WSN; and said domain name corresponding to the WSN is extracted from setup information corresponding to the WSN installation.

13. A computer program product comprising a non-transitory computer usable medium having a computer readable program code embodied therein for enabling a Wireless Sensor Network (WSN) messaging client to converse with an instant messaging client over a network during communication with one or more sensor nodes in a WSN, the computer program product comprising:

a program code adapted for:

identifying a first instant messaging client from among a plurality of instant messaging client that an user is using for communication by sending messages, wherein the first instant messaging client employs a first instant messaging protocol that is different from a second instant messaging protocol employed by a second instant messaging client from among the plurality of instant messaging clients;

determining one or more instant messaging protocols that is employed by the identified at least one instant messaging client;

configuring the WSN messaging client to operate with the determined one or more instant messaging protocols; and configuring the first instant messaging client for network communication with the one or more sensor nodes in the WSN through the WSN messaging client, by adding to the first instant messaging client a messaging buddy with a unique identifier name, associated with the configured WSN messaging client, wherein:

the unique identifier name associated with the configured WSN messaging client includes a domain name corresponding to the WSN; and said domain name corresponding to the WSN is extracted from setup information corresponding to the WSN installation.

\* \* \* \* \*